W. H. BROWN.
SPRING LUBRICATING CLIP.
APPLICATION FILED DEC. 4, 1914.
1,220,176.
Patented Mar. 27, 1917.
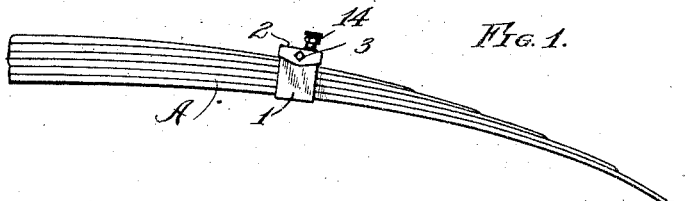
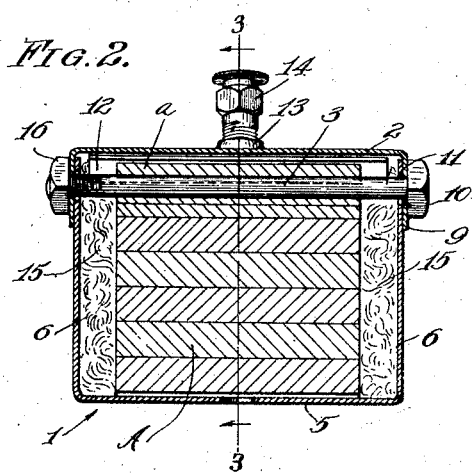
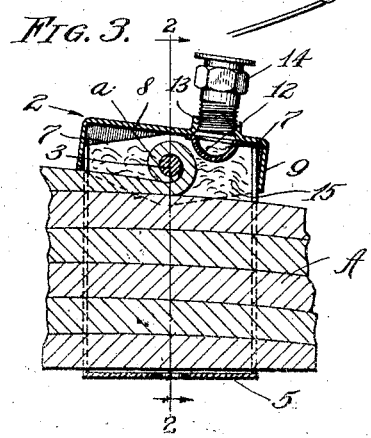
WITNESSES:
INVENTOR,
William H. Brown,
By Hull & Smith
ATT'YS.

UNITED STATES PATENT OFFICE.

WILLIAM H. BROWN, OF CLEVELAND, OHIO.

SPRING-LUBRICATING CLIP.

1,220,176.   Specification of Letters Patent.   Patented Mar. 27, 1917.

Application filed December 4, 1914. Serial No. 875,531.

*To all whom it may concern:*

Be it known that I, WILLIAM H. BROWN, a citizen of the United States, residing at Cleveland, in the county of Cuyahoga and State of Ohio, have invented a certain new and useful Improvement in Spring-Lubricating Clips, of which the following is a full, clear, and exact description, reference being had to the accompanying drawings.

This invention has relation to that type of oiler adapted for use on springs embodying a plurality of leaves, and the object of the invention is to simplify and improve this type of oiling device. The invention, as is obvious, may be embodied in a special attachment whose sole function is to lubricate the spring, but at the same time it will be observed that the construction of my device lends itself readily to embodiment in what are known as rebound clips, as well as to embodiment in clips that are used for securing springs to spring seats. In both instances, however, there is sufficient separation between the leaves of the spring at the points where the lubricant is applied to permit the lubricant to enter the capillary spaces between the surfaces of adjacent leaves.

In the accompanying drawings, wherein similar reference characters are used to designate corresponding parts throughout the several views, Figure 1 represents a fragmentary side elevation of a vehicle spring to which is applied a rebound, lubricating clip of my invention; Fig. 2 is a transverse section through the spring and clip shown in Fig. 1, the plane of the section being indicated by the line 2—2 of Fig. 3; and Fig. 3 is a section taken on the line 3—3 of Fig. 2, and showing a part of the spring in elevation.

The rebound lubricating clip shown is preferably formed of a sheet metal stamping and comprises a U shaped member 1 that embraces the spring A, and to the upper end of which is applied a cap 2 that extends across the spring and receives the free ends of the side branches of the U shaped member 1, the cap and the U shaped member being held together by a bolt 3 which passes through engaging parts of the cap and said member and, in the arrangement shown in the drawing, through the eye *a* of the upper leaf of the spring. It will be understood, however, that my rebound clip may be used upon inverted springs, as, for instance, upon the lower half of an elliptic spring, in which case the clip is inverted and the cap 2 thereof is beneath the spring.

The U shaped member 1 comprises a flat plate 5 which, in the arrangement shown, extends transversely beneath the bottom leaf of the spring, and from each end of the plate there rises an inwardly opening channel 6 that extends some distance above the top of the spring, and the webs of the channel are higher at their centers than at their lateral edges so that the cap 2, when applied to the channel member, is capable of a swinging movement in both directions. The oppositely inclined portions of the upper edge of one of the channel members is shown at 7, in Fig. 3.

The cap 2 consists of a flat plate 8 from which depends a peripheral flange 9, and the end portion of the flange are provided with apertures 10 which are arranged to register with the apertures 11 of the webs of the channels 6, for the reception of the bolt 3. 12, is a trough or conduit which is secured to the lower side of the plate 8 and extends longitudinally of the cap to within a short distance of its end flanges and opens at each end into one of the channels. An internally threaded boss 13 is struck up from the plate 8 above the trough 12, for the reception of an oil cup 14 (or other suitable lubricant receiving device).

Attention is called to the fact that the distance between the bolt 3 and the bottom plate 5 of the clip is slightly greater than the corresponding dimension of the spring when said spring is in any normal condition, thereby permitting a separation of the leaves during the action of the spring.

Before applying the rebound clip to a spring, the channels 6 are filled with an absorbent material 15 and the U shaped member 1 is placed about the spring, after which the cap 2 is applied to the free ends of the channels and the bolt 3 inserted into the alining openings 10 and 11 of the cap and U shaped member, respectively. The nut 16 is then applied to the bolt 3 to firmly hold the parts together. Oil, or other lubricant, can now be introduced into the clip through the cap 14, the lubricant being distributed, in both directions, through the trough or conduit 12 to the absorbent material in the opposed channels. The absorbent material will become saturated with the lubricant through the vertical extent of the channels and will be held in contact with the side edges of the spring leaves whence it will flow by capillary action between the leaves. This supply, in the case of rebound clips, is not limited to a capillary action, as the leaves will at times separate to an extent whereby the spaces therebetween will be of a width greater than capillary spaces. The lubricant will spread throughout the lengths of the leaves and very effectually lubricate the spring.

It will be observed that in the construction shown in Figs. 1, 2 and 3, the oiling device is secured against longitudinal movement on the spring by being anchored to one of the leaves of the spring by means of the eye $a$ and the pin or bolt 3, so that all the leaves of the spring will be capable of an independent sliding action on each other when the spring is flexed. This broad idea of anchoring the device to one of the leaves of the spring, thereby leaving the remainder of the leaves free to slide independently of the oiling device, is not claimed in this application, as it is covered by my co-pending application Serial No. 68,767, filed December 27, 1915. In this application I claim merely the specific form of the anchoring device illustrated, namely, the idea of anchoring the oiler by connecting it to an eye carried by one of the leaves, preferably the top leaf, of the spring.

It will be observed that the trough 12 (or 26) serves as a lubricant-receiving and holding reservoir communicating with the lubricant-holding pads, so that when supplying the pads with oil it will be unnecessary to wait for the pad to absorb all the oil, as the oil may be quickly put into the trough-like reservoir and left to run off at the end thereof and be slowly absorbed by the pad, thereby avoiding the consumption of an attendant's time.

Having thus described my invention, what I claim is:—

1. In combination with a spring composed of a plurality of superimposed leaves, one of said leaves being provided with an eye, an oiler for the spring carrying a member engaging said eye to thereby anchor the oiler to the leaf carrying the eye, said oiler carrying a lubricating pad pressing against the edges of the leaves so as to be agitated by the relative movement thereof.

2. In combination with a spring composed of a plurality of superimposed leaves, one of said leaves being provided with an eye, an oiler for the spring carrying a member engaging said eye to thereby anchor the oiler to the leaf carrying the eye, said eye being carried at the end of the upper leaf of the spring, said oiler carrying a lubricating pad pressing against the edges of the leaves so as to be agitated by the relative movement thereof.

3. An oiler of the type set forth, comprising two pad-holding chambers or channels and means for holding them against opposite sides of the spring, said means embodying a top member provided with a filling hole and an open-ended trough-like distributing device under the top member to receive the oil and deliver it to the pad-holding channels.

4. A lubricating clip for vehicle springs comprising a pair of branches adapted to extend upwardly along opposite sides of a spring, one of said branches being provided with a recess for the reception of a lubricant, a removable member connecting the upper ends of said branches, and means coöperating with said member for supplying a lubricant to the recess.

5. A lubricating clip for vehicle springs comprising a pair of branches adapted to extend upwardly along opposite sides of a spring, each of said branches being provided with a recess for the reception of a lubricant, removable means connecting the upper ends of said branches, and a distributer for lubricant associated with the connecting means and adapted to supply lubricant to both of said recesses.

6. A lubricating clip for vehicle springs comprising a pair of branches adapted to extend upwardly along opposite sides of a spring, one of said branches being provided with a lubricant receiving recess, a removable member connecting the upper ends of said branches, a lubricant container connected with said member, and a distributing device extending from said container to said recess.

7. A lubricating clip for vehicle springs comprising a pair of branches adapted to extend upwardly along opposite sides of a spring, each branch having a recess for lubricant, a removable member connecting the upper ends of said branches, a lubricant container carried by said member, and a distributer extending from said container in operative relation to said recess.

8. In an oiler of the type set forth, the combination of a pair of pad-holding channels or chambers adapted to apply oil to the opposite sides of the spring, the lower ends of said channels being integrally connected by a member extending across under the spring and the upper ends at a point above the spring being connected by a transverse bolt and also a top member carrying an oil-distributing device extending across the top of the spring.

9. In an oiler of the type set forth, the combination of a pair of pad-holding chambers and means for holding them in position against the side edges of the leaves of the spring embodying a bottom member extending across under the spring and devices for connecting the upper ends of the chambers above the top side of the spring, said devices consisting of a transverse bolt anchored to the top leaf of the spring, and a member extending across the spring, this member being provided with an oil hole and with an oil-distributing means underneath the top member in position to receive the oil poured through said hole and distribute it to the pads at opposite sides.

10. A lubricating clip for vehicle springs comprising a U shaped member which embraces the spring, the opposed branches whereof constitute inwardly opening channels that are adapted to receive an absorbent material, a flanged cap for application to the free ends of the U shaped member, a conduit within the cap that opens into the channels, means for introducing a lubricant into the conduit, and further means for securing the cap to the U shaped member.

11. In combination with a multi-leaf vehicle spring, one of the outer leaves having an eye, of a lubricating clip comprising a U shaped member which embraces the spring, the opposed branches whereof constitute inwardly opening channels that are adapted to receive an absorbent material, a flanged cap for application to the free ends of the U shaped member, and a bolt that passes through opposed flanges of the cap and the ends of the aforesaid member and through the eye of the spring.

12. In combination with a multi-leaf vehicle spring, one of the outer leaves having an eye, of a lubricating clip comprising a U shaped member which embraces the spring, the opposed branches whereof constitute inwardly opening channels that are adapted to receive an absorbent material, a flanged cap for application to the free ends of the U shaped member, a conduit within the cap that opens into the channels, means for introducing a lubricant into the conduit, and a bolt that passes through opposed flanges of the cap and the ends of the aforesaid member, and through the aforesaid eye.

In testimony whereof, I hereunto affix my signature in the presence of two witnesses.

WILLIAM H. BROWN.

Witnesses:
 JOHN B. HULL,
 BRENNAN B. WEST.